United States Patent
Gill

(12) 
(10) Patent No.: US 6,181,537 B1
(45) Date of Patent: Jan. 30, 2001

(54) TUNNEL JUNCTION STRUCTURE WITH JUNCTION LAYER EMBEDDED IN AMORPHOUS FERROMAGNETIC LAYERS

(75) Inventor: Hardayal Singh Gill, Portola Valley, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/280,300

(22) Filed: Mar. 29, 1999

(51) Int. Cl.$^7$ ........................................ G11B 5/39
(52) U.S. Cl. .............................................. 360/324.2
(58) Field of Search ................... 360/324, 324.1, 360/324.11, 324.12, 324.2; 324/252; 338/32 R; 365/158

(56) References Cited

U.S. PATENT DOCUMENTS

| | | | |
|---|---|---|---|
| 5,446,613 | * 8/1995 | Rottmayer | 360/319 |
| 5,668,688 | * 9/1997 | Dykes et al. | 360/324.1 |
| 5,898,548 | * 4/1999 | Dill et al. | 360/324.2 |
| 5,966,012 | * 10/1999 | Parkin | 360/324.2 |
| 5,986,858 | * 11/1999 | Sato et al. | 360/324.2 |
| 6,023,395 | * 2/2000 | Dill et al. | 360/324.2 |
| 6,078,484 | * 6/2000 | Sakakima | 360/324 |

FOREIGN PATENT DOCUMENTS

| | | | |
|---|---|---|---|
| 9-251618 | * | 9/1997 | (JP) . |
| 10-162326 | * | 6/1998 | (JP) . |
| 11-316919 | * | 11/1999 | (JP) . |

* cited by examiner

*Primary Examiner*—David L. Ometz
(74) *Attorney, Agent, or Firm*—Gray Cary Ware & Freidenrich LLP; Ervin F. Johnston

(57) ABSTRACT

A tunnel junction sensor of a read head with a tunnel junction barrier layer embedded in amorphous ferromagnetic layers. The tunnel junction sensor includes an antiferromagnetic pinning layer, a crystalline pinned layer, an amorphous pinned layer, a tunnel junction barrier layer, an amorphous free layer and a crystalline free layer. The antiferromagnetic pinning layer is exchange coupled to the pinned layers so as to pin a magnetic moment in each of the pinned layers in a first direction. The free layers each have a magnetic moment oriented in a second direction, preferably perpendicular to the first direction.

51 Claims, 6 Drawing Sheets

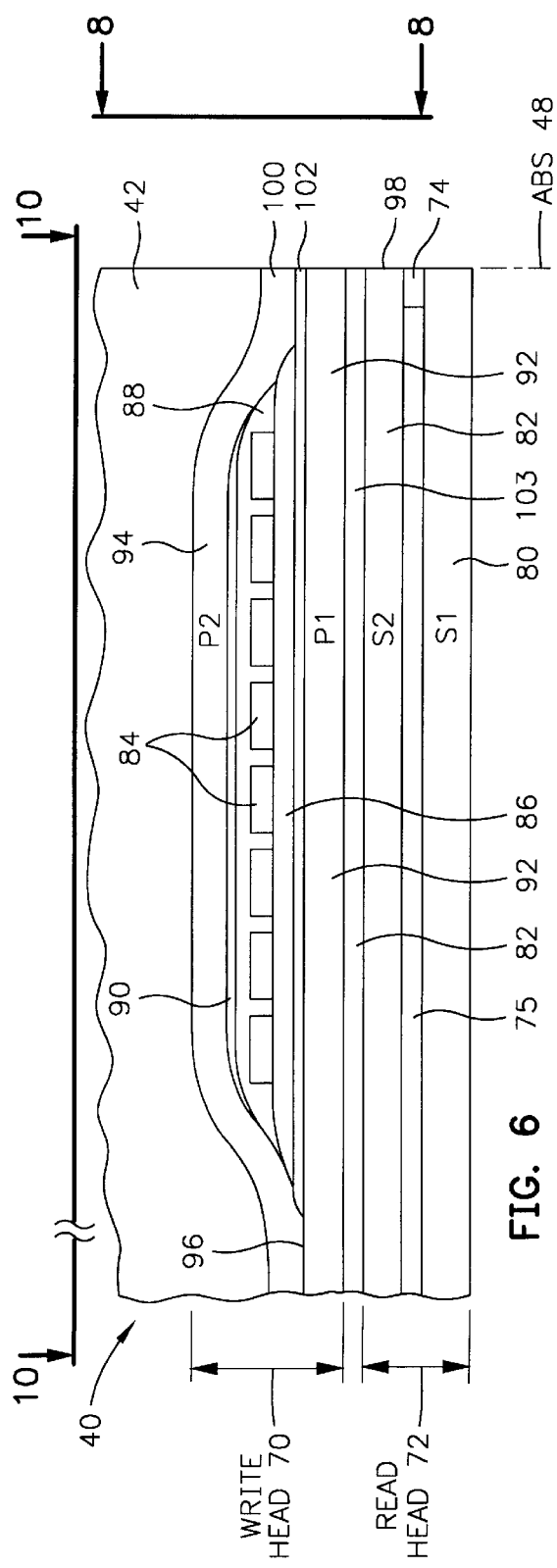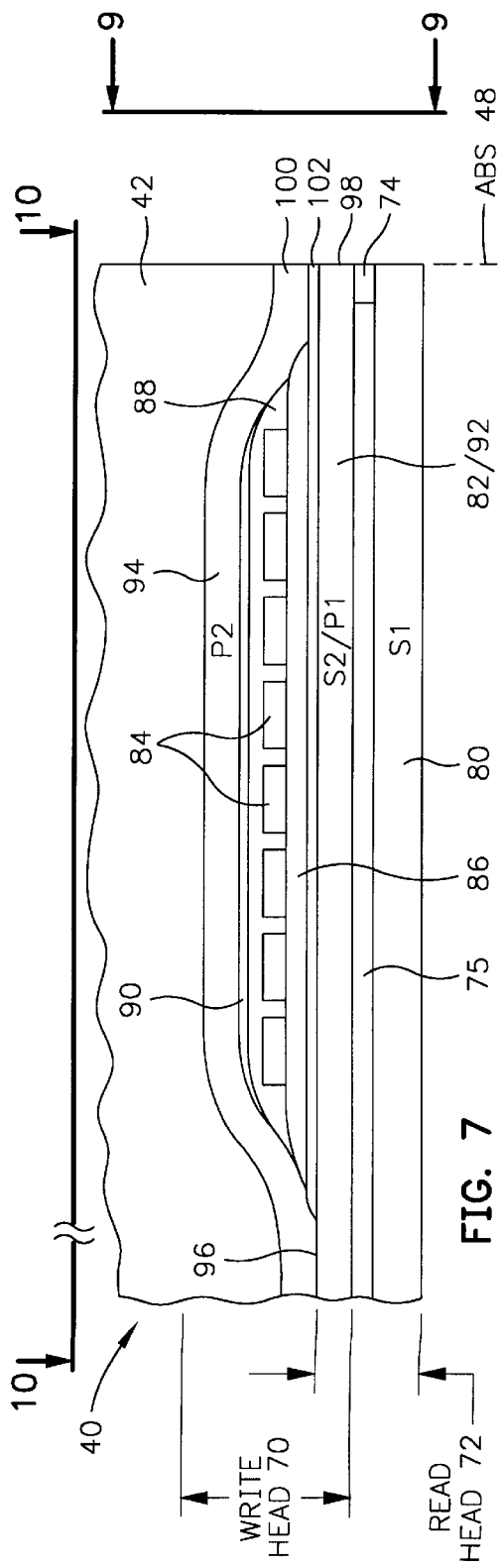

TUNNEL JUNCTION STRUCTURE WITH JUNCTION LAYER EMBEDDED IN AMORPHOUS FERROMAGNETIC LAYERS

BACKGROUND OF THE INVENTION

1. Field of the Invention

The present invention relates to a tunnel junction structure and, more particularly, to a tunnel junction structure in which the tunnel junction layer is embedded in amorphous ferromagnetic layers.

2. Description of the Related Art

A read head employing a read sensor may be combined with an inductive write head to form a combined magnetic head. In a magnetic disk drive, an air bearing surface (ABS) of the combined magnetic head is supported adjacent a rotating disk to write information on or read information from the disk. Information is written to the rotating disk by magnetic fields which fringe across a gap between the first and second pole pieces of the write head. In a read mode, the resistance of the read sensor changes proportionally to the magnitudes of the magnetic fields from the rotating disk. When a current is conducted through the read sensor, resistance changes cause potential changes that are detected and processed as playback signals in processing circuitry.

One type of read sensor is a tunnel junction sensor. The details of tunnel junction have been described in a commonly assigned U.S. Pat. No. 5,650,958 to Gallagher et al., which is incorporated by reference herein. A typical tunnel junction sensor has two ferromagnetic layers (i.e., the pinned and free layers) separated by a thin spacer layer which relies upon the phenomenon of spin-polarized electron tunneling. The free and pinned layers, which may be NiFe or CoFe, are crystalline in structure and are separated by an electrically insulating spacer layer that is thin enough that quantum mechanical tunneling occurs between the free and pinned layers. The tunneling phenomenon is electron spin dependent, making the magnetic response of the tunnel junction sensor a function of the relative orientations and spin polarization of the conduction electrons between the free and pinned layers. Ideally, the magnetic moment orientation of the pinned layer should be pinned 90° to the magnetic moment orientation of the free layer, with the magnetic direction of the free layer being able to respond to external magnetic fields. The pinned layer has a magnetic moment that is pinned in its orientation by exchange coupling with a pinning layer that is made of an antiferromagnetic material. Large ferromagnetic coupling (>20 Oe) occurs between the pinned and free layers. This large coupling causes improper magnetic bias for the free ferromagnetic layer which results in a distorted readback signal. One reason for this ferromagnetic coupling between the pinned and free layers is interfacial roughness. This roughness results from thin film crystalline texture as a result of epitaxy type growth of these films.

There is a strong felt need for a tunnel junction structure that reduces the ferromagnetic coupling between the pinned and free ferromagnetic layers, which thereby reduces distortion in the read back signal.

SUMMARY OF THE INVENTION

The present invention is directed toward a tunnel junction structure in which the tunnel junction barrier layer is embedded in amorphous ferromagnetic layers. Major reasons of ferromagnetic coupling between ferromagnetic layers is interfacial roughness due to the crystallinity of the material. To avoid this problem, the present invention discloses the use of amorphous ferromagnetic layers on each side of the tunnel junction layer. These amorphous ferromagnetic layers suppress any epitaxial growth between them as well as have a high saturation flux density. This will reduce the magnetic bias of the free ferromagnetic layer, thereby reducing distortion in the read back signal.

The tunnel junction sensor includes an antiferromagnetic (AFM) pinning layer, a crystalline pinned layer, an amorphous pinned layer, a tunnel junction barrier layer, an amorphous free layer and a crystalline free layer (optional). The tunnel junction barrier layer being embedded between the amorphous pinned layer and the amorphous free layer. For the tunnel junction head to work efficiently, the orientation of the magnetic moment of the crystalline and amorphous free layers should be perpendicular to the orientation of the magnetic moment of the crystalline and amorphous pinned layers.

A tunneling current $I_T$ flows through the tunnel junction head, perpendicular to the plane of the films or layers. The amount of current $I_T$ that flows through is dependent on the relative magnetic moment directions of the pinned and free layers and magnetic moments. As the tunnel junction sensor is positioned over a rotating magnetic disk, external magnetic fields sensed from the rotating disk moves the direction of magnetic moments of the free layers up or down, changing the resistance through the tunnel junction sensor. As the tunnel current $I_T$ is conducted through the sensor, the increase and decrease of electron tunneling (i.e., increase and decrease in resistance) are manifested as potential changes. These potential changes are then processed as readback signals by the processing circuitry of the disk drive. Optionally, the directions of the magnetic moments of the free and pinned layers may be opposite to that described hereinabove.

Other objects and advantages of the present invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
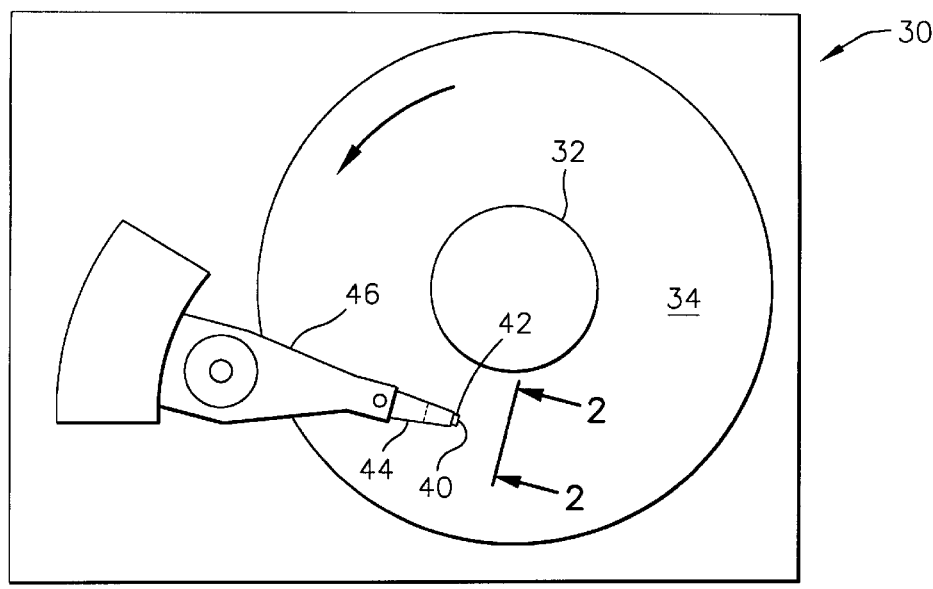
FIG. 1 is a plan view of an exemplary magnetic disk drive.
Figure 2:
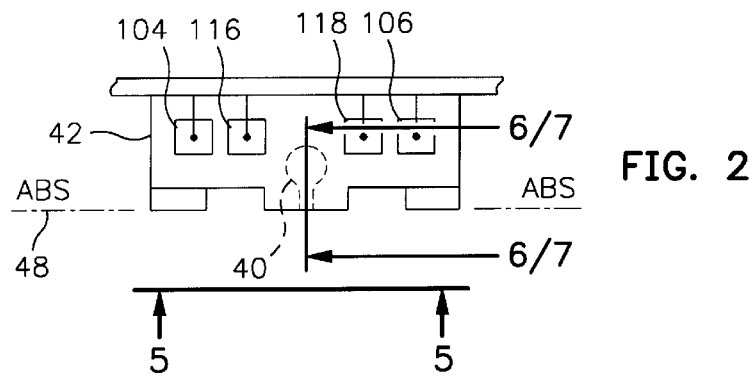
FIG. 2 is an end view of a slider with a magnetic head as seen in plane 2—2 of FIG. 1.
Figure 3:
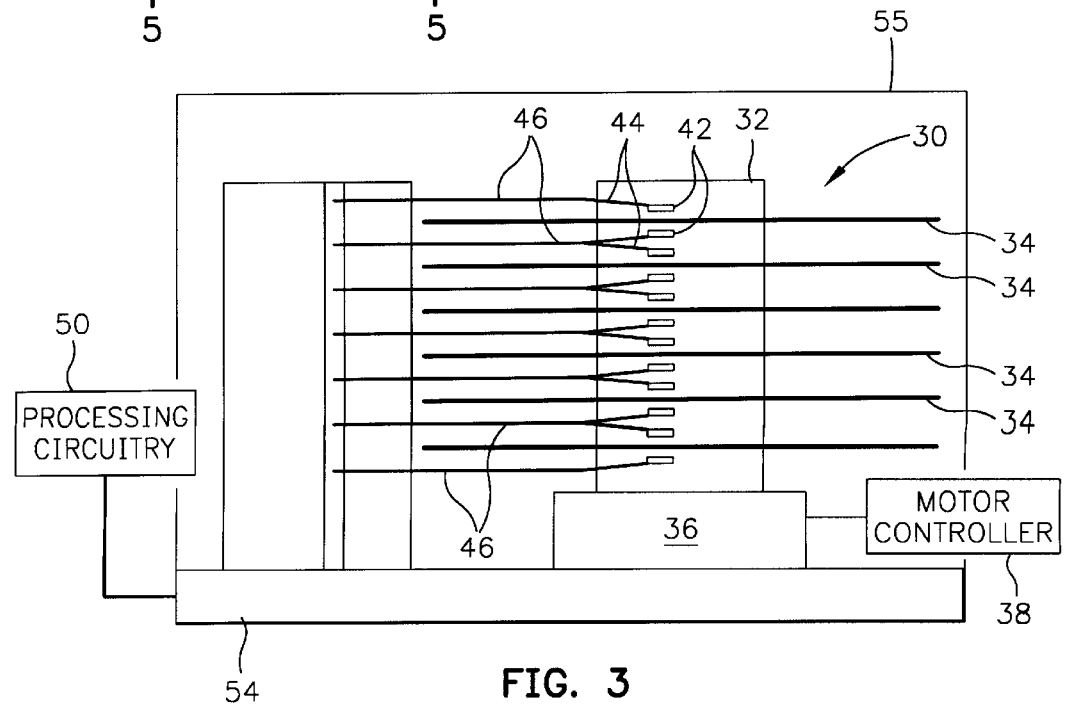
FIG. 3 is an elevation view of the magnetic disk drive wherein multiple disks and magnetic heads are employed.
Figure 4:
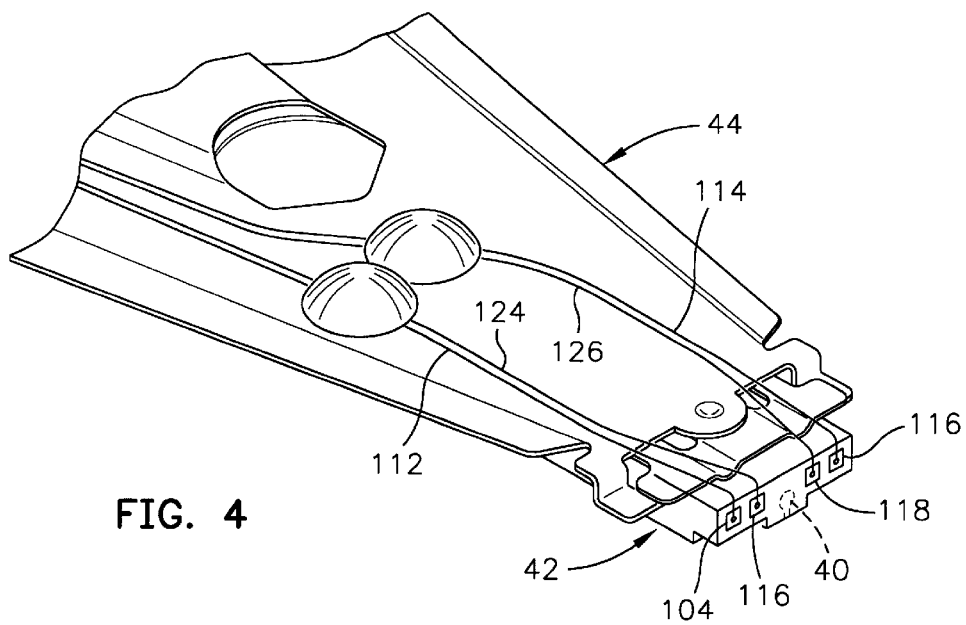
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various circular tracks on the disk. FIG. 4 shows the mounting of the slider 42 to the suspension 44, which will be described hereinafter. The components described hereinabove may be mounted on a frame 54 of a housing 55, as shown in FIG. 3.

Figure 5:
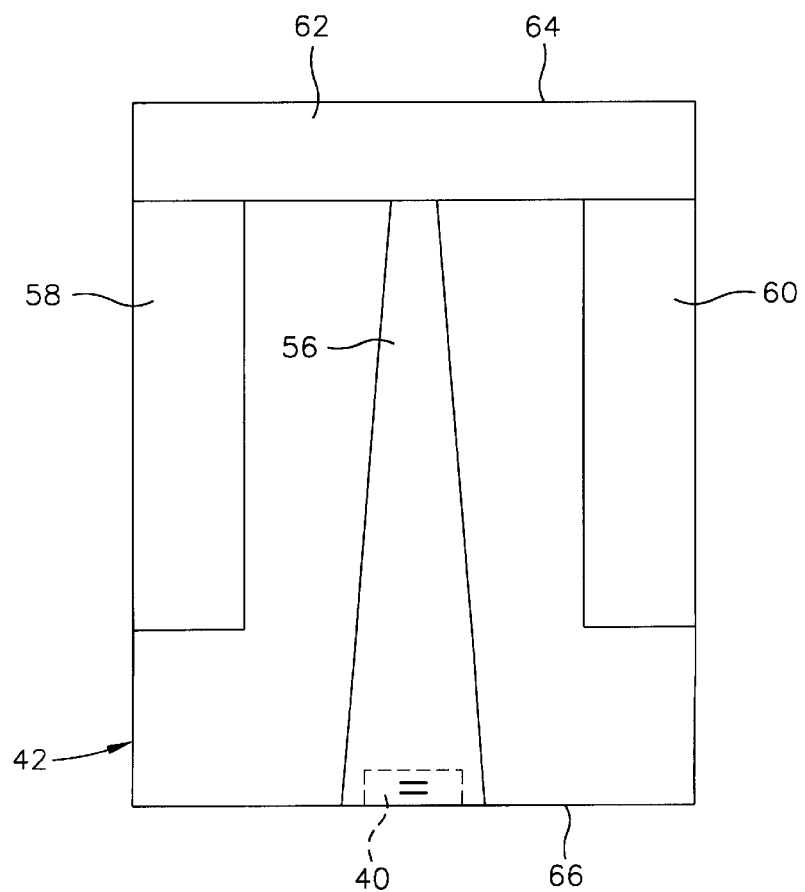
FIG. 5 is an ABS view of the slider taken along in plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
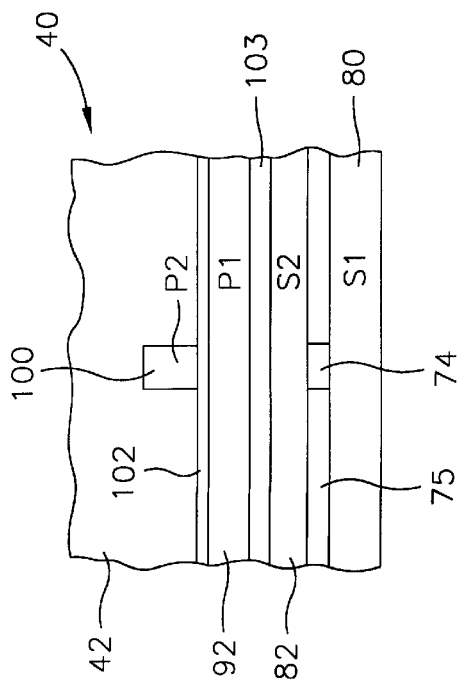
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing an pinned spin valve sensor 74 of the present invention. FIG. 8 is an ABS view of FIG. 6. The spin valve sensor 74 and insulating gap payer 75 are sandwiched between first and second shield layers 80 and 82. The insulating gap layer 75 insulates the shields from each other and may be made from aluminum oxide, aluminum nitride or silicone dioxide. In response to external magnetic fields, the resistance of the spin valve sensor 74 changes. To determine the resistance, a tunneling sense current $I_T$ is used. The first and second shield layers 80 and 82 are employed as leads. As the magnetic moment of the free layer rotates in response to the magnetic field from the disk, the resistance of the tunnel junction structure changes, altering the current through the structure. These resistance changes to be manifested as potential changes. These potential changes are then processed as readback signals by the processing circuitry 50 shown in FIG. 3.

Figure 10:
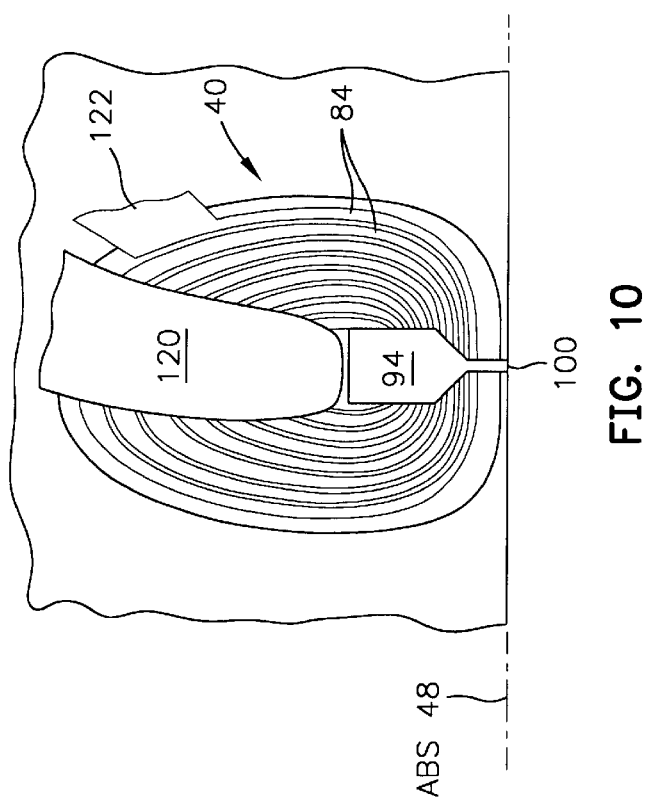
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers, this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
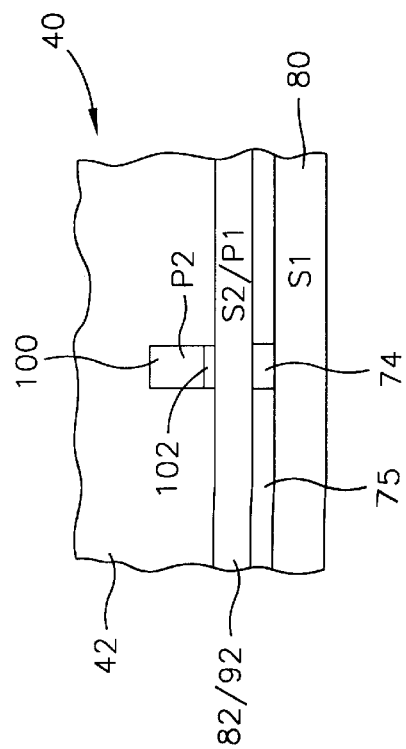
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as the merged magnetic head. The insulation layer 103 of the piggyback head in FIGS. 6 and 8 is omitted in the merged head.

Present Invention

The present invention is directed toward a tunnel junction structure in which the tunnel junction layer is embedded in amorphous ferromagnetic layers. Major reasons of ferromagnetic coupling between ferromagnetic layers is interfacial roughness. This roughness results from thin film crystalline texture as a result of epitaxial type growth of these films. To avoid this problem, the present invention discloses the use of amorphous ferromagnetic layers on each side of the tunnel junction layer. These amorphous ferromagnetic layers have a high saturation flux density and reduce the interfacial roughness. This will reduce the magnetic bias for the free ferromagnetic layer, thereby reducing distortion in the read back signal.

Figure 11:
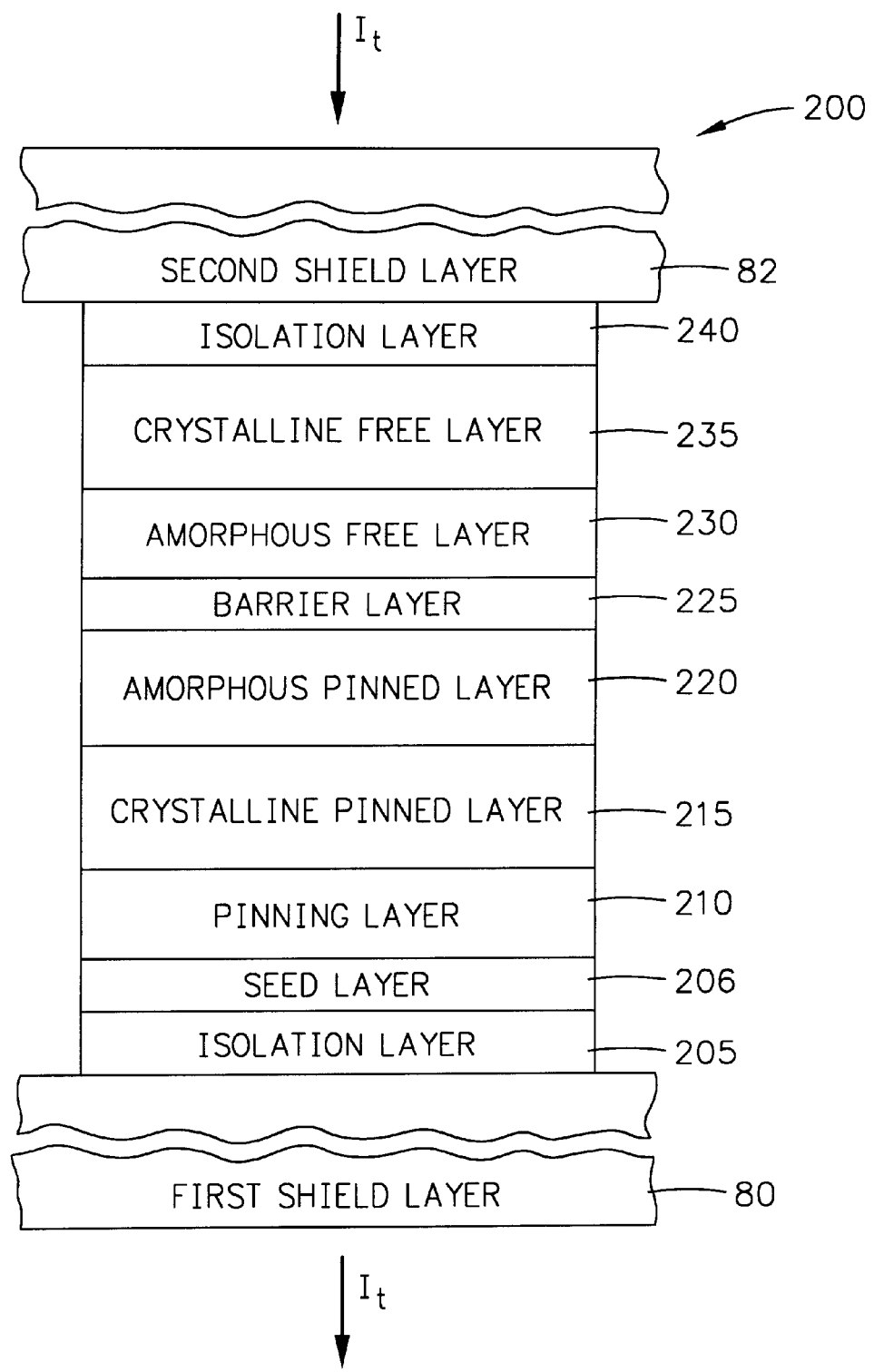
FIG. 11 is a partial air bearing surface (ABS) illustration of one embodiment of the sensor of the present invention.
Figure 12:
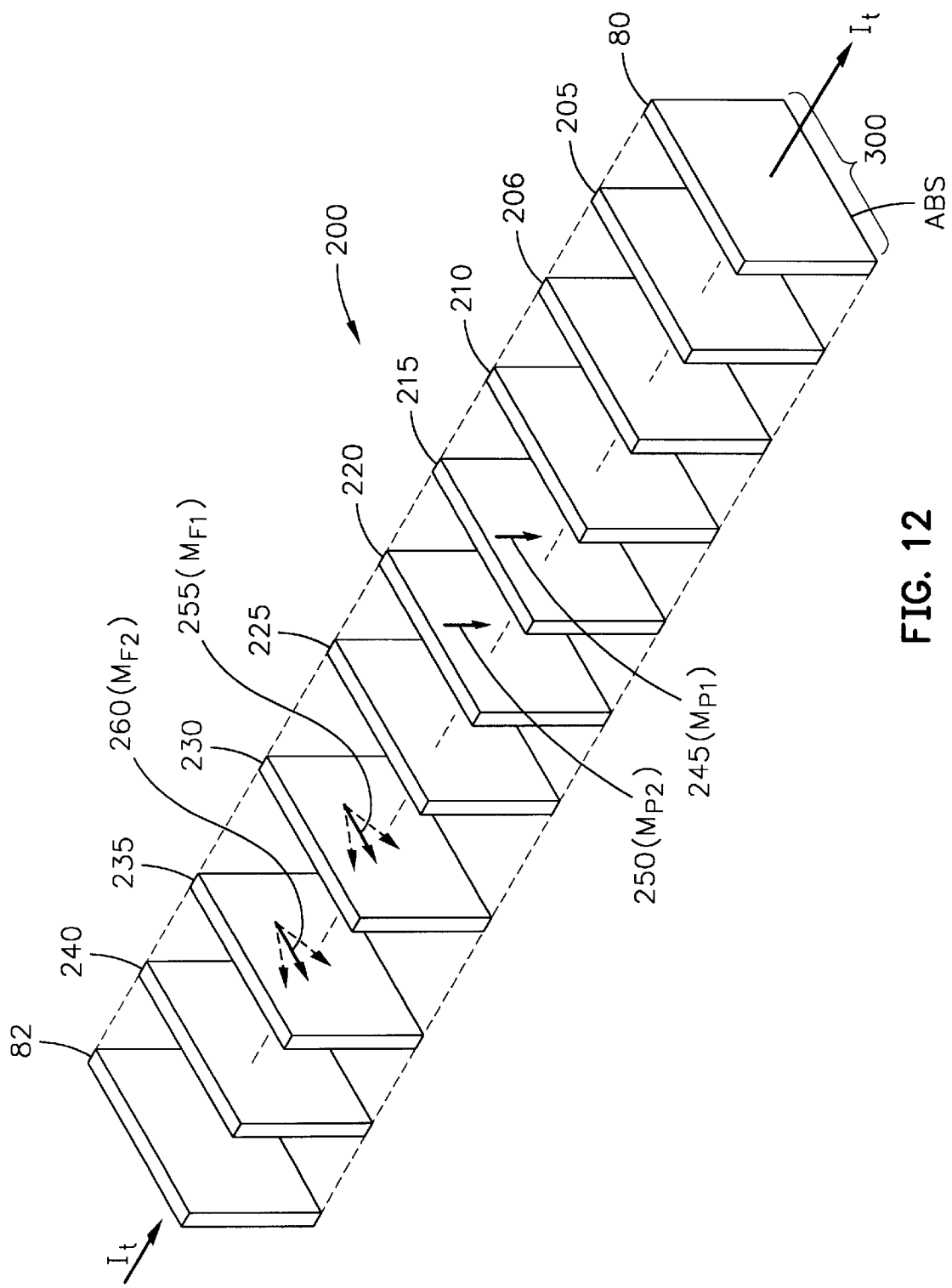
FIG. 12 is an exploded view of FIG. 11.

FIG. 11 shows one embodiment of the tunnel junction sensor 200 which includes a first shield layer 80, an isolation layer 205, a seed layer 206, a pinning layer 210, a crystalline pinned layer 215, an amorphous pinned layer 220, a tunnel junction barrier layer 225, an amorphous free layer 230, a crystalline free layer 235, an isolation layer 240 and a second shield layer 82. FIG. 12 is an exploded view of FIG. 11 showing the layers and exemplary desired orientations of the magnetic moments of the free and pinned layers. The magnetic moment ($M_{P1}$) 245 of the crystalline pinned layer 215 and the magnetic moment ($M_{P2}$) 250 of the amorphous pinned layer 220 are pinned parallel in a first direction, preferably perpendicular to the ABS, by interfacial exchange coupling with the pinning layer 210. It is important that the pinning layer material provides strong pinning to the pinned layers. If required, one or more seed layers 206 may be used to assure proper pinning strength. The magnetic moment ($M_{F1}$) 255 of the amorphous free layer 230 and the magnetic moment ($M_{F2}$) 260 of the crystalline free layer 235 are biased parallel in a second direction. To keep the tunnel junction magnetically isolated from the first shield 80 and second shield 82, isolation layers are positioned between them, shown in the figures as isolation layer 205 and isolation layer 240. The isolation layers are made of an electrically conductive, magnetically isolating material such as tantalum, gold or copper. In the preferred embodiment, the orientation of the magnetic moments 255 and 260 parallel to the ABS are (i.e., the moment direction 255 and 260 are in a direction along a track width 300, perpendicular to the magnetic moments 245 and 250).

In use, a tunneling current $I_T$, using spin dependent electron tunneling, flows through the tunnel junction sensor 200, using the first 80 and second 82 shield layers as leads. The amount of current $I_T$ that flows through is dependent on the relative magnetic moment directions between the crystalline 215 and amorphous 220 pinned layers and the amorphous 230 and crystalline 235 free layers. As the tunnel junction sensor 200 is positioned over the magnetic disk 34, the external magnetic fields sensed from the rotating disk 34 moves the direction of magnetic moment 255 of the amorphous free layer 230 and the magnetic moment 260 of the crystalline free layer 235 up or down, changing the resistance through the tunnel junction sensor 200. Since the magnetizations of the amorphous 230 and crystalline 235 free layers are in-phase and the magnetizations of the crystalline 215 and amorphous 220 pinned layers are in-phase, the change in resistance ($\Delta R/R$) due to the tunneling is additive, and therefore provides sensitivity enhancement. As the magnetic moments 255 and 260 rotate up from the ABS (i.e., going toward the opposite direction of the magnetic moments 245 and 250), the amount of electron tunneling decreases (i.e., the resistance increases). As the magnetic moments 255 and 260 rotate down toward the ABS (i.e., going toward the same direction as the magnetic moments 245 and 250), the amount of electron tunneling increases (i.e., the resistance decreases). As the tunnel current $I_T$ is conducted through the tunnel junction sensor 200, the increase and decrease of electron tunneling (i.e., increase and decrease in resistance) are manifested as potential changes. These potential changes are then processed as readback signals by the processing circuitry shown in FIG. 3.

The first 80 and second 82 shields layers are made from a conductive material, such as Permalloy which is $Ni_{80}Fe_{20}$. The pinning layer 210 may be made of a conductive antiferromagnetic material such as iron manganese (FeMn), having a thickness range of 50–250 Å, preferably 150 Å. Other conductive antiferromagnetic (AFM) materials such as nickel manganese (NiMn), platinum manganese (PtMn), iridium manganese (IrMn), chromium aluminum manganese (CrAlMn) or palladium manganese (PdMn) may be used. The crystalline pinned layer 215 may be made from a ferromagnetic material such as cobalt iron ($Co_{90}Fe_{10}$) with a thickness of 10–50 Å, preferably 30 Å. Optionally, the pinned layers may be made from nickel iron (NiFe) or Cobalt (Co). The crystalline pinned layer 215 is exchange coupled to the pinning layer 210 such that the orientation of the magnetic moment 245 is in the same direction as the magnetic spins of the pinning layer 210. The amorphous pinned layer 220 may be made from an amorphous material such as $Co_{90}Nb_{10}$, $Co_{90}(NbHfFe)_{10}$ or $Co_{90}(NbZr)_{10}$ having a thickness of 5–10 Å, preferably 5 Å. The tunnel junction barrier layer may be made of aluminum oxide, with a thickness of 5–20 Å, preferably 10 Å. The first amorphous free layer 230 may be made from an amorphous material such as $Co_{90}Nb_{10}$, $Co_{90}(NbHfFe)_{10}$ or $Co_{90}(NbZr)_{10}$ having a thickness of 5–10 Å, preferably 5 Å. The crystalline free layer 235 may be made from a ferromagnetic material such as cobalt iron ($Co_{90}Fe_{10}$) with a thickness of 10–50 Å, preferably 20 Å. Optionally, the crystalline free layer 235 may be omitted, with only the amorphous free layer 230 being used. When the crystalline free layer is omitted, the amorphous free layer 230 is made thicker. The first and second shields 80 and 82 may be used as leads for the tunnel junction sensor 200. The inductive write head 70 is then formed on the tunnel junction read sensor 200 (or read head 72, see FIG. 6). While the above description is a construction of one embodiment of the present invention, there are other layers that may be added to improve the tunnel junction sensor 200.

Seed layers or interface layers may be used in the tunnel junction sensor 200 to assure proper attachment of the layers and also control grain size, texture and crystal structure. For example, in FIG. 11, a first seed layer 206 is shown between the first shield layer 80 and the pinning layer 210. The seed layers are typically made of nickel iron (NiFe) or cobalt iron (CoFe) with a thickness of 10–20 Å.

Clearly, other embodiments and modifications of this invention will occur readily to those of ordinary skill in the art in view of these teachings. While the description of the tunnel junction sensor is described in relation to a magnetic disk drive read/write head, it should understood that in other applications, the tunnel junction sensor may be used alone or in combination with other devices. Therefore, the disclosed invention is to be considered merely illustrative and limited in scope only as specified in the appended claims.

What is claimed is:

1. A tunnel junction read head, which has an air bearing surface (ABS), comprising:
   a tunnel junction sensor that includes:
      an electrically conductive antiferromagnetic pinning layer;
      an electrically conductive ferromagnetic amorphous pinned layer, the amorphous pinned layer having a magnetic moment in a first direction;
      an electrically conductive ferromagnetic crystalline pinned layer located between the pinning layer and the amorphous pinned layer, the crystalline pinned layer being exchange coupled to the crystalline pinning layer so as to pin the pinned layer magnetic moment in said first direction;
      an electrically conductive ferromagnetic amorphous free layer, the amorphous free layer having a magnetic moment in a second direction; and
      a non-magnetic electrically insulating barrier layer located between the amorphous pinned layer and the amorphous free layer.

2. The tunnel junction read head as claimed in claim 1 further including:
   an electrically conductive and magnetically isolating first isolation layer;
   an electrically conductive and magnetically isolating second isolation layer, the tunnel junction sensor being located between the first and second isolation layers; and
   first and second shield layers, the tunnel junction sensor with the first and second isolation layers being located between the first and second shield layers with the first isolation layer adjacent the first shield layer and the second isolation layer adjacent the second shield layer.

3. The tunnel junction read head as claimed in claim 2 further including:
   an electrically conductive ferromagnetic crystalline free layer having a magnetic moment in the second direction, the crystalline free layer being located between the amorphous free layer and the adjacent isolation layer.

4. The tunnel junction read head as claimed in claim 2 or 3 wherein the first and second shields are used as electrical leads.

5. The tunnel junction read head as claimed in claim 1 wherein the antiferromagnetic pinning layer is selected from the group MnFe, NiMn, IrMn, PtMn, CrAlMn and PdMn.

6. The tunnel junction read head as claimed in claim 1 or 3 wherein the crystalline pinned and crystalline free layers are selected from the group CoFe, NiFe and Co.

7. The tunnel junction read head as claimed in claim 1 wherein the amorphous pinned and amorphous free layers are selected from the group CoNb, CoNbHfFe and CoNbZr.

8. The tunnel junction read head as claimed in claim 1 wherein the barrier layer is made from aluminum oxide.

9. The tunnel junction read head as claimed in claim 1 wherein the first direction is normal to the ABS.

10. A tunnel junction magnetic head assembly having a write head and a tunnel junction read head, which has an air bearing surface (ABS) comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the tunnel junction read head including:
a tunnel junction sensor responsive to applied magnetic fields;
first and second electrically conductive lead layers connected to the tunnel junction sensor for conducting a tunnel current through the tunnel junction sensor; the tunnel junction sensor including:
an electrically conductive antiferromagnetic pinning layer;
an electrically conductive ferromagnetic amorphous pinned layer, the amorphous pinned layer having a magnetic moment in a first direction;
an electrically conductive ferromagnetic crystalline pinned layer located between the pinning layer and the amorphous pinned layer, the crystalline pinned layer being exchange coupled to the pinning layer so as to pin the crystalline pinned layer magnetic moment in said first direction;
an electrically conductive ferromagnetic amorphous free layer having a magnetic moment in a second direction; and
a non-magnetic electrically insulating barrier layer located between the amorphous pinned layer and the amorphous free layer;
electrically conductive and magnetically isolating first and second isolation layers, the tunnel junction sensor being located between the first and second isolation layers; and
a ferromagnetic electrically conductive first shield layer, the tunnel junction sensor with the first and second isolation layers being located between the first shield layer and the first pole piece layer.

11. The tunnel junction magnetic head as claimed in claim 10 further including:
a second shield layer being located between the tunnel junction sensor and the first pole piece layer; and
an insulation layer, the insulation layer being located between the second shield layer and the first pole piece layer.

12. The tunnel junction magnetic head as claimed in claim 11 wherein the first and second electrically conductive lead layers are respectively the electrically conductive first and second shield layers.

13. The tunnel junction magnetic head as claimed in claim 10 or 11 further including:
an electrically conductive ferromagnetic crystalline free layer having a magnetic moment in the second direction, the crystalline free layer being located between the amorphous free layer of the sensor and the respective isolation layer.

14. The tunnel junction magnetic head as claimed in claim 13 wherein the crystalline pinned and crystalline free layers are selected from the group CoFe, NiFe and Co.

15. The tunnel junction magnetic head as claimed in claim 10 wherein the first and second electrically conductive lead layers are respectively the electrically conductive first shield layer and the first pole piece layer.

16. The tunnel junction magnetic head as claimed in claim 10 wherein the antiferromagnetic pinning layer is selected from the group MnFe, NiMn, IrMn, PtMn, CrAlMn and PdMn.

17. The tunnel junction magnetic head as claimed in claim 10 wherein the amorphous pinned and amorphous free layers are selected from the group CoNb, CoNbHfFe and CoNbZr.

18. The tunnel junction magnetic head as claimed in claim 10 wherein the barrier layer is made from aluminum oxide.

19. The tunnel junction magnetic head as claimed in claim 10 wherein the first direction is normal to the ABS.

20. A magnetic disk drive that includes at least one write head and tunnel junction magnetic head, which has an air bearing surface (ABS), the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the tunnel junction read head including:
a tunnel junction sensor that has a track width responsive to applied magnetic fields; and
first and second electrically conductive lead layers connected to the tunnel junction sensor for conducting a tunnel current through the tunnel junction sensor; the tunnel junction sensor including:
an electrically conductive antiferromagnetic pinning layer;
an electrically conductive ferromagnetic amorphous pinned layer, the amorphous pinned layer having a magnetic moment in a first direction;
an electrically conductive ferromagnetic crystalline pinned layer being located between the pinning layer and the amorphous pinned layer, the crystalline pinned layer being exchange coupled to the pinning layer so as to pin the crystalline pinned layer magnetic moment in said first direction;
an electrically conductive ferromagnetic amorphous free layer having a magnetic moment in a second direction; and
a non-magnetic electrically insulating barrier layer located between the amorphous pinned layer and the amorphous free layer;
electrically conductive and magnetically isolating first and second isolation layers, the tunnel junction sensor being located between the first and second isolation layers;

a ferromagnetic electrically conductive first layer, the tunnel junction sensor with the first and second isolation layers being located between the first shield layer and the first pole piece layer;

a housing;

a magnetic disk rotatably supported in the housing;

a support mounted in the housing for supporting the magnetic head with its ABS facing the magnetic disk so that the magnetic head is in a transducing relationship with the magnetic disk;

means for rotating the magnetic disk;

positioning means connected to the support for moving the magnetic head to multiple positions with respect to said magnetic disk; and processing means connected to the magnetic head, to the means for rotating the magnetic disk and to the positioning means for exchanging signals with the magnetic head, for controlling movement of the magnetic disk and for controlling the position of the magnetic head.

21. The tunnel junction magnetic head as claimed in claim 20 further including:

a second shield layer being located between the tunnel junction sensor and the first pole piece layer; and an insulation layer, the insulation layer being located between the second shield layer and the first pole piece layer.

22. The magnetic disk drive as claimed in claim 21 wherein the first and second electrically conductive lead layers are respectively the electrically conductive first and second shield layers.

23. The magnetic disk drive as claimed in claim 20 or 21 further including:

an electrically conductive ferromagnetic crystalline free layer having a magnetic moment in the second direction, the crystalline free layer being located between the amorphous free layer of the sensor and the respective isolation layer.

24. The magnetic disk drive as claimed in claim 23 wherein the crystalline pinned and crystalline free layers are selected from the group CoFe, NiFe and Co.

25. The magnetic disk drive as claimed in claim 20 wherein the processing means is connected to the first and second leads for applying the tunneling sense current to the tunnel junction sensor.

26. The magnetic disk drive as claimed in claim 25 wherein the processing means applies said tunneling sense current.

27. The tunnel junction magnetic head as claimed in claim 20 wherein the first and second electrically conductive lead layers are respectively the electrically conductive first shield layer and the first pole piece layer.

28. The magnetic disk drive as claimed in claim 20 wherein the antiferromagnetic pinning layer is selected from the group MnFe, NiMn, IrMn, PtMn, CrAlMn and PdMn.

29. The magnetic disk drive as claimed in claim 20 wherein the amorphous pinned and amorphous free layers are selected from the group CoNb, CoNbHfFe and CoNbZr.

30. The magnetic disk drive as claimed in claim 20 wherein the barrier layer is made from aluminum oxide.

31. The magnetic disk drive as claimed in claim 20 wherein the first direction is normal to the ABS.

32. A method of making a tunnel junction read head that has an air bearing surface (ABS) comprising the steps of:

forming a tunnel junction sensor that includes:

forming an electrically conductive antiferromagnetic pinning layer;

forming an electrically conductive ferromagnetic crystalline pinned layer on the pinning layer, the crystalline pinned layer being exchange coupled to the pinning layer so as to pin the pinned layer magnetic moment in a first direction;

forming an electrically conductive ferromagnetic amorphous pinned layer on the crystalline pinned layer, the amorphous pinned layer having a magnetic moment in the first direction;

forming a non-magnetic electrically insulating barrier layer on the amorphous pinned layer;

forming an electrically conductive ferromagnetic amorphous free layer on the barrier layer, the amorphous free layer having a magnetic moment in a second direction.

33. The method forming the tunnel junction sensor as claimed in claim 32 further including:

forming an electrically conductive ferromagnetic crystalline free layer on the amorphous free layer, the crystalline free layer having a magnetic moment in the second direction.

34. The method as claimed in claim 33 wherein the crystalline pinned and crystalline free layers are selected from the group CoFe, NiFe and Co.

35. The method as claimed in claim 32 or 33 further including:

forming a first shield layer;

forming a first isolation layer, the first isolation layer being located between the first shield layer and the tunnel junction sensor;

forming a second shield layer; and forming a second isolation layer, the second isolation layer being located between the second shield layer and the tunnel junction sensor.

36. The method as claimed in claim 35 wherein the first and second shield layers are used as electrical leads.

37. The method as claimed in claim 32 wherein the antiferromagnetic pinning layer is selected from the group MnFe, NiMn, IrMn, PtMn, CrAlMn and PdMn.

38. The method as claimed in claim 32 wherein the amorphous pinned and amorphous free layers are selected from the group CoNb, CoNbHfFe and CoNbZr.

39. The method as claimed in claim 32 wherein the barrier layer is made from aluminum oxide.

40. The method as claimed in claim 32 wherein the first direction is normal to the ABS.

41. A method of making a tunnel junction magnetic head that has an air bearing surface (ABS) comprising:

forming a tunnel junction read head that has a track width as follows:

forming a ferromagnetic electrically conductive first shield layer;

forming an electrically conductive, magnetically isolating first isolation layer on the first shield layer;

forming a tunnel junction sensor on the first isolation layer as follows:

forming an electrically conductive antiferromagnetic pinning layer;

forming an electrically conductive ferromagnetic crystalline pinned layer on the pinning layer, the crystalline pinned layer being exchange coupled to the pinning layer so as to pin the pinned layer magnetic moment in a first direction;

forming an electrically conductive ferromagnetic amorphous pinned layer on the crystalline pinned layer, the amorphous pinned layer having a magnetic moment in said first direction;

forming a non-magnetic electrically insulating barrier layer on the amorphous pinned layer; and forming an electrically conductive ferromagnetic amorphous free layer on the barrier layer, the amorphous free layer having a magnetic moment in a second direction;

forming an electrically conductive, magnetically isolating second isolation layer on the free layer of the tunnel junction sensor; and forming a write head on the read head as follows:
  forming a first pole piece layer;
  forming a write gap layer and an insulation stack with a coil layer embedded therein on the first pole piece layer; and
  forming a second pole piece layer on the insulation stack and the write gap and connected at a back gap to the first pole piece.

42. The method as claimed in claim 41 further including:

forming a second shield layer on the second isolation layer; and forming an insulation layer on the second shield layer.

43. The method as claimed in claim 42 wherein the first and second shield layers are used as electrical leads.

44. The method as claimed in claim 41 further including:

forming an electrically conductive ferromagnetic crystalline free layer on the amorphous free layer, the crystalline free layer having a magnetic moment in the second direction.

45. The method as claimed in claim 44 wherein the crystalline pinned and crystalline free layers are selected from the group CoFe, NiFe and Co.

46. The method as claimed in claim 41 further including:

providing a tunneling current source for applying a tunneling sense current, the sensing current flows in a third direction.

47. The method as claimed in claim 41 wherein the first shield layer and the first pole piece layer are used as electrical leads.

48. The method as claimed in claim 41 wherein the antiferromagnetic pinning layer is selected from the group MnFe, NiMn, IrMn, PtMn, CrAlMn and PdMn.

49. The method as claimed in claim 41 wherein the amorphous pinned and amorphous free layers are selected from the group CoNb, CoNbHfFe and CoNbZr.

50. The method as claimed in claim 41 wherein the barrier layer is made from aluminum oxide.

51. The method as claimed in claim 41 wherein the first direction is normal to the ABS.

* * * * *